US011602131B2

(12) United States Patent
Calandro et al.

(10) Patent No.: US 11,602,131 B2
(45) Date of Patent: Mar. 14, 2023

(54) TANGLE FREE ELASTIC PET TETHER

(71) Applicants: Damon Dominic Calandro, Mickleton, NJ (US); Patricia Ann Calandro, Mickleton, NJ (US)

(72) Inventors: Damon Dominic Calandro, Mickleton, NJ (US); Patricia Ann Calandro, Mickleton, NJ (US)

( * ) Notice: Subject to any disclaimer, the term of this patent is extended or adjusted under 35 U.S.C. 154(b) by 99 days.

(21) Appl. No.: 17/088,636

(22) Filed: Nov. 4, 2020

(65) Prior Publication Data
US 2021/0127639 A1 May 6, 2021

Related U.S. Application Data

(60) Provisional application No. 62/929,968, filed on Nov. 4, 2019.

(51) Int. Cl.
*A01K 27/00* (2006.01)
*A01K 1/04* (2006.01)
(52) U.S. Cl.
CPC .......... *A01K 27/003* (2013.01); *A01K 27/005* (2013.01); *A01K 27/006* (2013.01); *A01K 1/04* (2013.01)
(58) Field of Classification Search
CPC .. A01K 27/003; A01K 27/005; A01K 27/006; E05B 73/0005
See application file for complete search history.

(56) References Cited

U.S. PATENT DOCUMENTS

| 4,974,549 | A | * | 12/1990 | Gordon | F16G 11/06 24/135 R |
|---|---|---|---|---|---|
| 5,967,095 | A | * | 10/1999 | Greves | A01K 27/006 119/859 |
| 6,460,488 | B1 | | 10/2002 | Manzella et al. | |
| 6,581,548 | B1 | * | 6/2003 | Reid | A01K 27/003 119/795 |
| 8,683,959 | B2 | * | 4/2014 | Friedland | A01K 1/04 119/793 |
| 9,363,982 | B2 | | 6/2016 | Fleming et al. | |
| 9,816,296 | B2 | * | 11/2017 | Denny | E05B 37/02 |
| 2004/0200436 | A1 | * | 10/2004 | Staack | A01K 27/005 119/792 |
| 2013/0174616 | A1 | * | 7/2013 | Allen, Jr. | A01K 27/001 119/793 |
| 2017/0042124 | A1 | | 2/2017 | Cooper et al. | |
| 2017/0347631 | A1 | | 12/2017 | Dolan | |

FOREIGN PATENT DOCUMENTS

CA    2143573 A1    8/1996

* cited by examiner

*Primary Examiner* — Kristen C Hayes

(57) ABSTRACT

A pet tether comprising a flexible and stretchable cord comprising first end and a second end, a first cord clamp and a second cord claim. The first cord clamp is configured to clamp the first end of the cord when the first end of the cord passes through the first cord clamp and loops back into the first cord clamp. The second cord clamp is configured to clamp the second end of the cord when the second end of the cord passes through the second cord clamp and loops back into the second cord clamp.

9 Claims, 11 Drawing Sheets

TANGLE FREE ELASTIC PET TETHER

CROSS-REFERENCE TO RELATED APPLICATIONS

This application claims priority to and the benefit of provisional patent application No. 62/929,968 titled "Flexible Pet Tether", filed in the United States Patent and Trademark Office on Nov. 4, 2019. The specification of the above referenced application is incorporated herein by its entirety.

BACKGROUND

Pets such as dogs, cats, etc., are often restrained by their owners using a pet tether. Many pet owners use pet tethers to train their pets, as an optional restraint apparatus when fencing is not feasible and/or permitted, and/or as an attachment on an overhead pully run line, to walk their pets, etc. A conventional pet tether typically comprises a lead with one clip on each end; one attaches to the pet's collar or harness, and the another attaches to an affixed object such as a ground stake or swivel tie-out. If used properly, a carefully designed pet tether can allow pet owners to feel confident that their pet is safe, happy, and secure.

A conventional pet tether is typically comprised of a metal chain or steel wire lead. Use of these conventional pet tethers often cause frustration for the pet owner and are a safety hazard for the pet. For example, a tether made from steel wire often kinks, resulting in the formation of knots that are difficult for the user to untangle and that create tears that compromise the structure of the wire lead. Additionally, pet tethers comprised of a metal chain or steel wire often rust when used outdoors, reducing the integrity of the chain's ability to withstand the pull of the pet. Furthermore, a pet tether consisting of a rigid metal chain or any other inelastic material results in an abrupt stop when the pet reaches the end of the tether, often at high speed. This may cause significant injury to the pet, especially its neck, due to the unyielding and non-stretchable nature of the conventional pet tether. Should other extremities of the pet become entangled in the metal chain or steel wire, such as a leg, the pet could sustain further injury as a result of the inflexible nature of the materials.

Furthermore, conventional pet tethers used outdoors, often at night, do not include a motion activated light source to help illuminate the immediate area around the pet. While illuminated collars can be used with traditional pet tethers to increase the visibility and safety of a pet at night, this illumination is limited to the vicinity adjacent to neck of the pet and does not provide visibility to the pet and the pet owner on the ground in the direction the pet is moving.

Hence, there exists a need for a flexible and stretchable pet tether, hereafter referred to as a pet tether, that does not cause injury to a pet's neck and/or other extremities when the pet pulls on the pet tether. There also exists a need for a flexible and stretchable pet tether that helps to prevent sudden and abrupt, wrenching of the pet's neck There also exists a need for a pet tether comprised of a pliable material that is weather-resistant and easy to untangle to reduce frustration for pet owners and to increase confidence that the tether's lead remains uncompromised. Furthermore, there exists a need for a motion activated light source in communication with the pet tether that illuminates the immediate ground near the pet.

SUMMARY OF THE INVENTION

This summary is provided to introduce a selection of concepts in a simplified form that are further disclosed in the detailed description of the invention. This summary is not intended to determine the scope of the claimed subject matter.

The pet tether disclosed herein provides a flexible, stretchable, and tangle-free pet tether that does not cause injury to a pet's neck or other extremities when the pet pulls against the pet tether. The pet tether disclosed herein is flexible and stretchable, and helps to prevent sudden and abrupt, wrenching of the pet's neck. The pet tether disclosed herein also comprises an integral motion activated light source that illuminates the nearby areas around the pet. The pet tether disclosed herein comprises a light source in communication with the pet tether that illuminates the nearby areas around the pet. The pet tether disclosed herein is made of a pliable material that is weather-resistant and easy to untangle to reduce frustration for pet owners and increase confidence that the pet tether's lead remains uncompromised.

The pet tether disclosed herein comprises a flexible, stretchable, and tangle-free cord comprised of a first end and a second end, a first cord clamp, and a second cord clamp. The first cord clamp is configured to clamp the first end of the cord when the first end of the cord passes through the first cord clamp and loops back into the first cord clamp. The second cord clamp is configured to clamp the second end of the cord when the second end of the cord passes through the second cord clamp and loops back into the second cord clamp. The pet tether further comprises a first engagement element connected to the loop in the first end of the cord, and a second engagement element connected to the loop in the second end of the cord. The pet tether further comprises one or more light sources integrated in the first cord clamp. The light sources enable the flexible pet tether to be used during dusk or nighttime and enhances the safety of the pets and confidence of their owners.

The pet tether provides a pet owner with a tangle-free alternative to the standard metal chain and/or steel wire cable tie-out and also provides safety and security to the pet. The design keeps the pet safe by allowing for neck protection through the combined use of a flexible and elastic cord design and a 360-degree rotatable, rust-free engagement element on each end of the cord. Also, disclosed herein, is a tether illumination system that lights the nearby areas around the pet to allow the pet and the pet owner to easily see the ground in the direction the pet is moving.

BRIEF DESCRIPTION OF DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific structures/components of the apparatus disclosed herein. The description of a structure/component referenced by a numeral in a drawing is applicable to the description of that structure/component of the apparatus shown by that same numeral in any subsequent drawing herein.

DETAILED DESCRIPTION OF THE INVENTION

Disclosed herein is a pet tether which comprises an integrated light source for illumination the ground nearby areas around the pet, for use during dusk or nighttime to enhance safety of pets and their owners. Further, the embodiments herein provide a pet owner with a flexible, tangle-free pet tether alternative to conventional steel wire or chain tie-outs.

Figure 1:
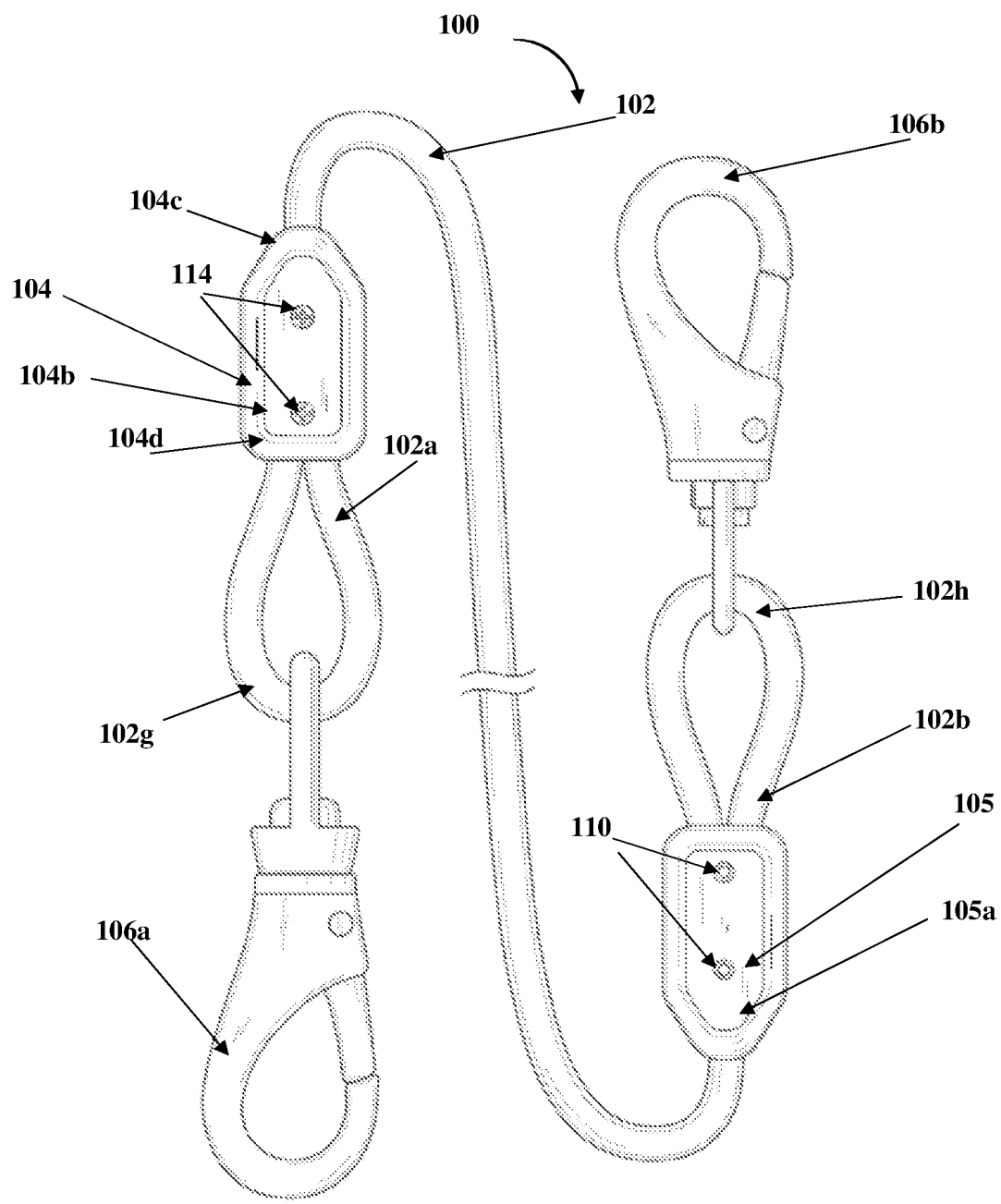
FIG. 1 illustrates a front view of the pet tether comprising a flexible and stretchable cord, a first cord clamp, and a second cord clamp.
Figure 7:
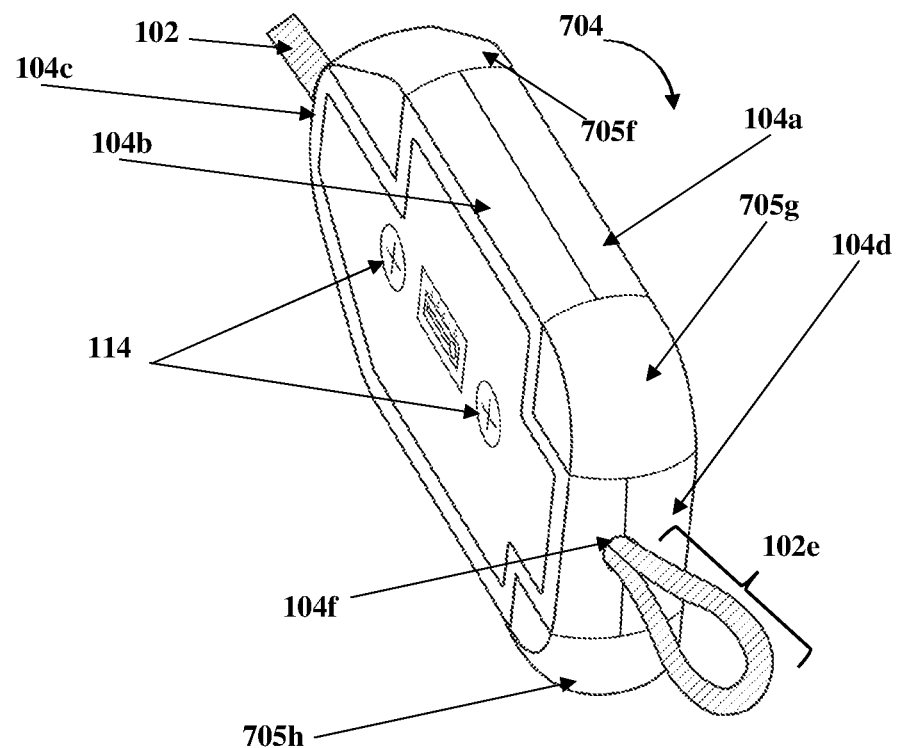
FIG. 7 illustrates a front right-side perspective view of an embodiment of a first cord clamp comprising one or more light sources.
Figure 8:
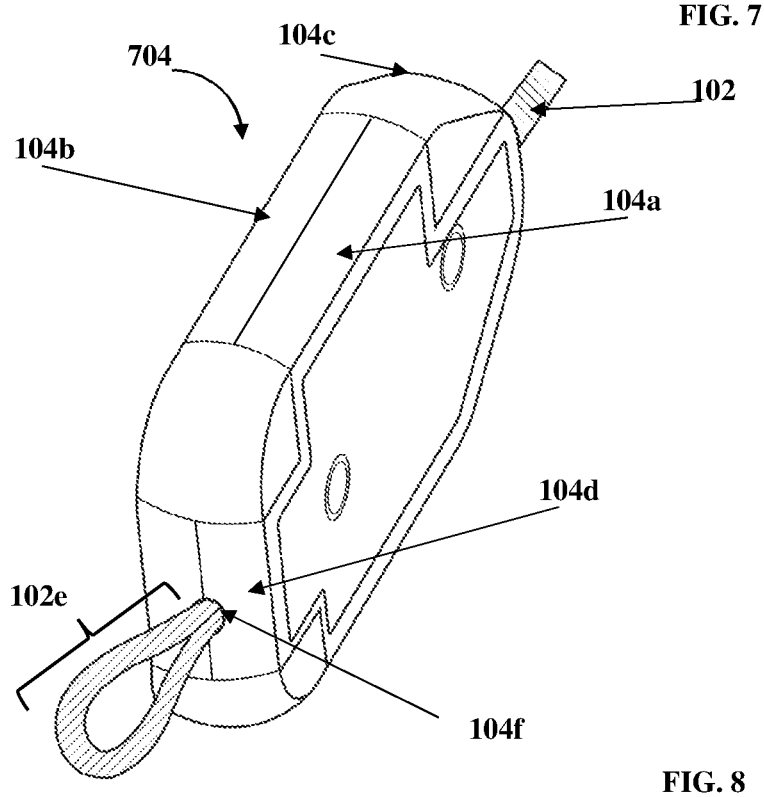
FIG. 8 illustrates a rear left-side perspective view of an embodiment of the first cord clamp comprising one or more light sources.
Figure 9:
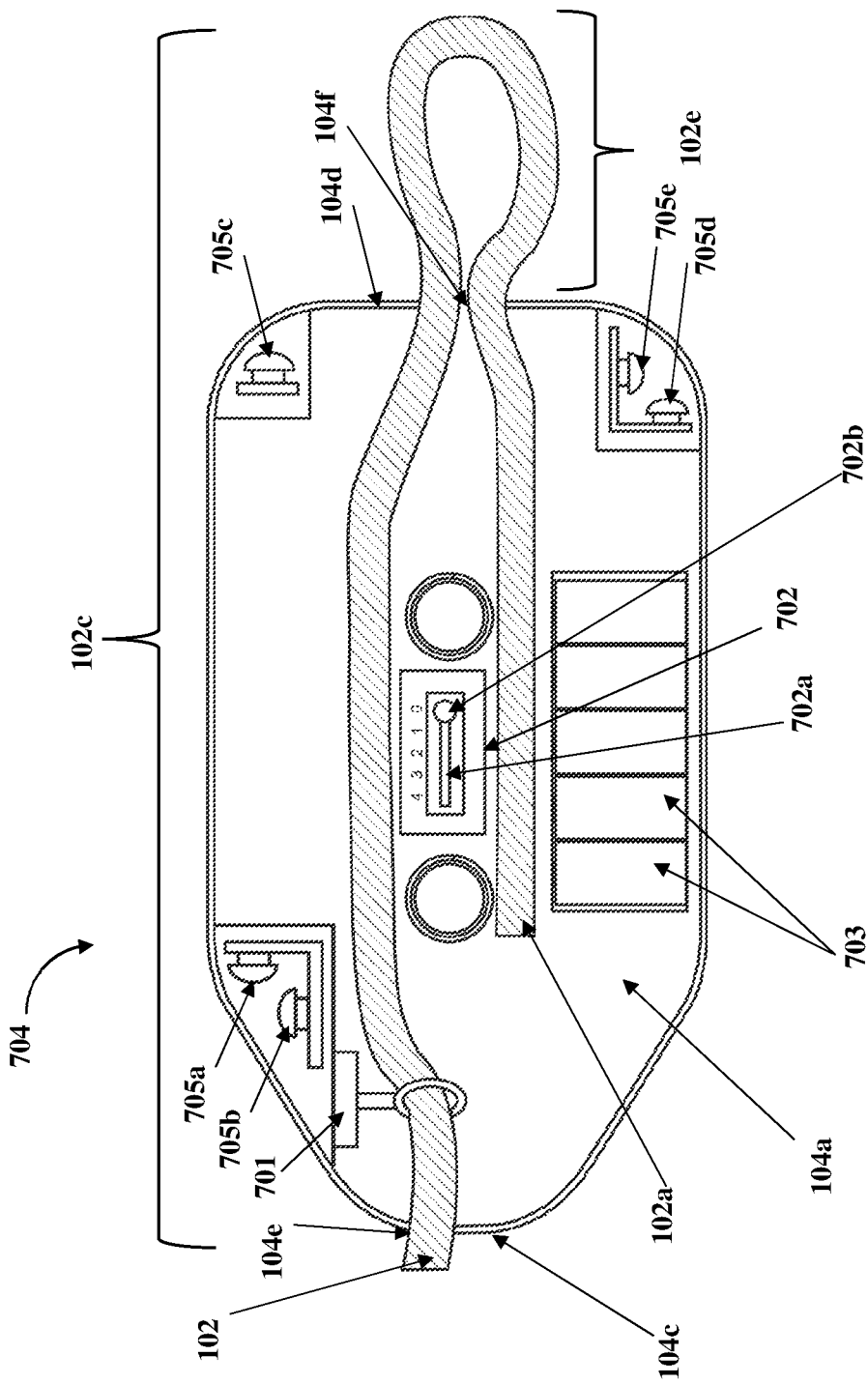
FIG. 9 illustrates a front view of an embodiment of the first cord clamp with a cap of the first cord clamp removed to illustrate a base of the first cord clamp comprising the light sources, a pull type switch, a slide switch, batteries and the flexible and stretchable cord.
Figure 10:
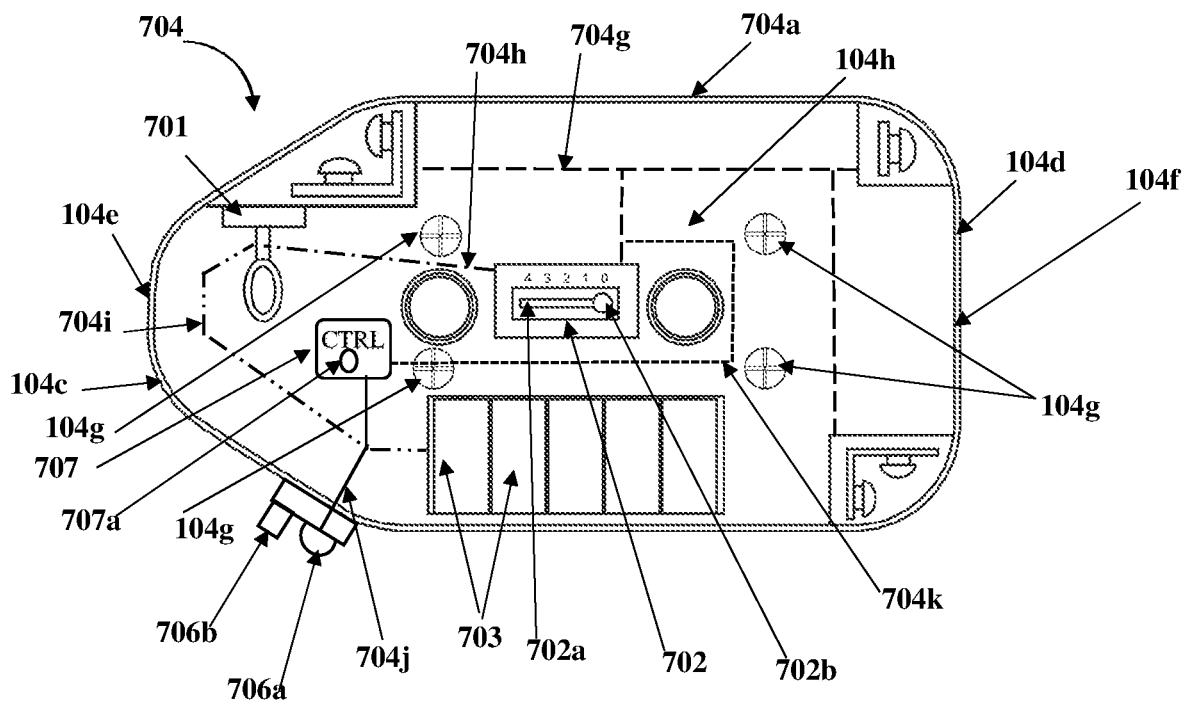
FIG. 10 illustrates a front view of an embodiment of the first cord clamp showing the spikes in the base of the first cord clamp.
Figure 11:
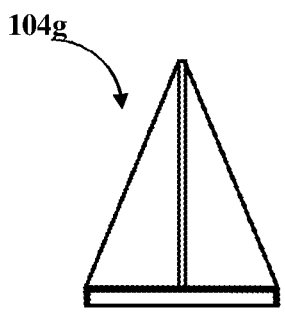
FIG. 11 illustrates a left-side view of one of the spikes in the base of the first cord clamp, the right-side, front and rear views of the spike being mirror images of the left-side view.
Figure 12:
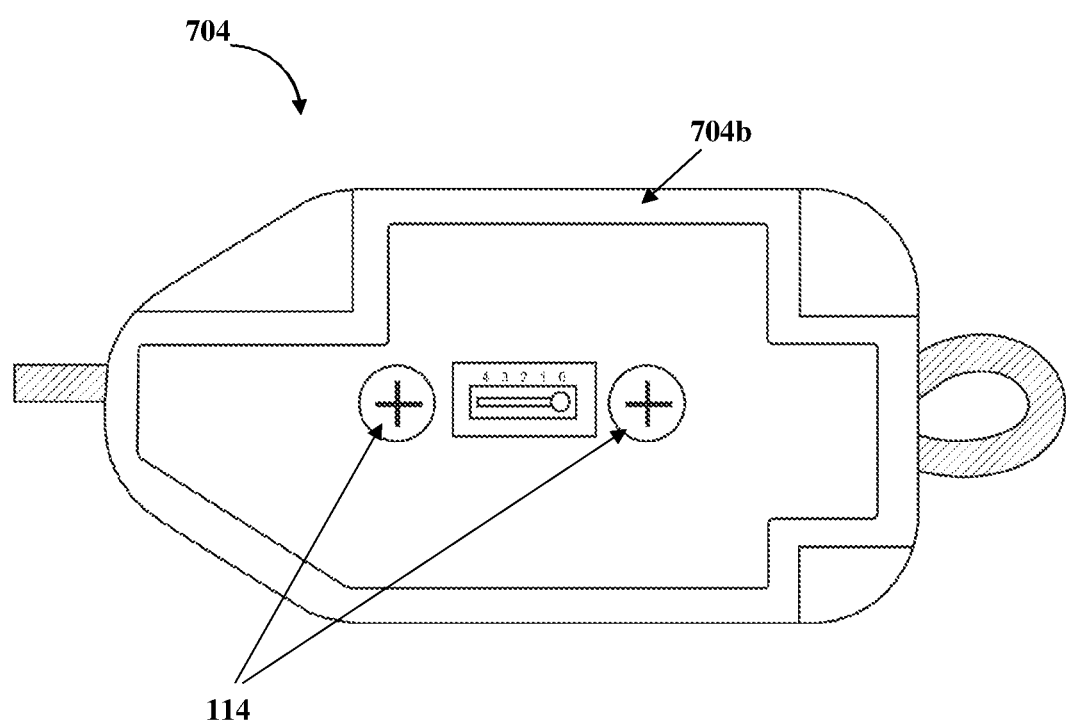
FIG. 12 illustrates a front view of the second embodiment of the first cord clamp with the cap of the first cord clamp fastened to the base of the second embodiment of the first cord clamp using fasteners.

FIG. 1 illustrates a front view of the pet tether 100 comprising a flexible and stretchable cord 102, a first cord clamp 104, and a second cord clamp 105. The pet tether 100 illustrated in FIG. 1 is in a non-stretched state. The flexible and stretchable cord 102 comprises a first end 102a and a second end 102b. The first cord clamp 104 comprises a first end 104c and a second end 104d. The first cord clamp 104 further comprises a first opening 104e at a first end 104c and a second opening 104f at the second end 104d, as shown in FIGS. 7-10. The first cord clamp 104 is configured to clamp the first end 102a of the cord 102 when the first end 102a of the cord 102 passes through the first cord clamp 104 and loops 102g back into the first cord clamp 104, as shown in FIG. 9. As illustrated in FIG. 9, a first portion 102c of the flexible and stretchable cord 102 that is proximal to the first end 102a of the flexible and stretchable cord 102 engages with the first cord clamp 104 with the mid-section 102e of the first portion 102c of the flexible and stretchable cord 102 projecting outside a first end 104c of the first cord clamp 104. Also, as shown in FIG. 9, the first end 102a of the flexible and stretchable cord 102 enters the first cord clamp 104 through the first opening 104e, exits the first cord clamp 104 through the second opening 104f, forms a loop 102g with the mid-section 102e of the first portion 102c of the flexible and stretchable cord 102, reenters the first cord clamp 104 through the second opening 104f at the second end 104d. The first cord clamp 104 further comprises a base 104a and a cap 104b, as illustrated in FIGS. 7-10. The base 104a comprises spikes 104g that are perpendicular to an interior surface 104h of the base 104a, as shown in FIGS. 10 and 11. In an embodiment, the spikes 104g are integrally formed on the interior surface 104h of the base 104a. The flexible and stretchable cord 102 is laid on top of the spikes 104g and forcibly pressed on the spikes 104g to enable the spikes 104g to pierce the flexible and stretchable cord 102. The cap 104b of the first cord clamp 104 is then fastened to the base 104a of the first cord clamp 104 using fastening members 114, for example screws, as shown in FIGS. 1, 7 and 12, to secure the first end 102a of the flexible and stretchable cord 102 with the first cord clamp 104.

Figure 2:
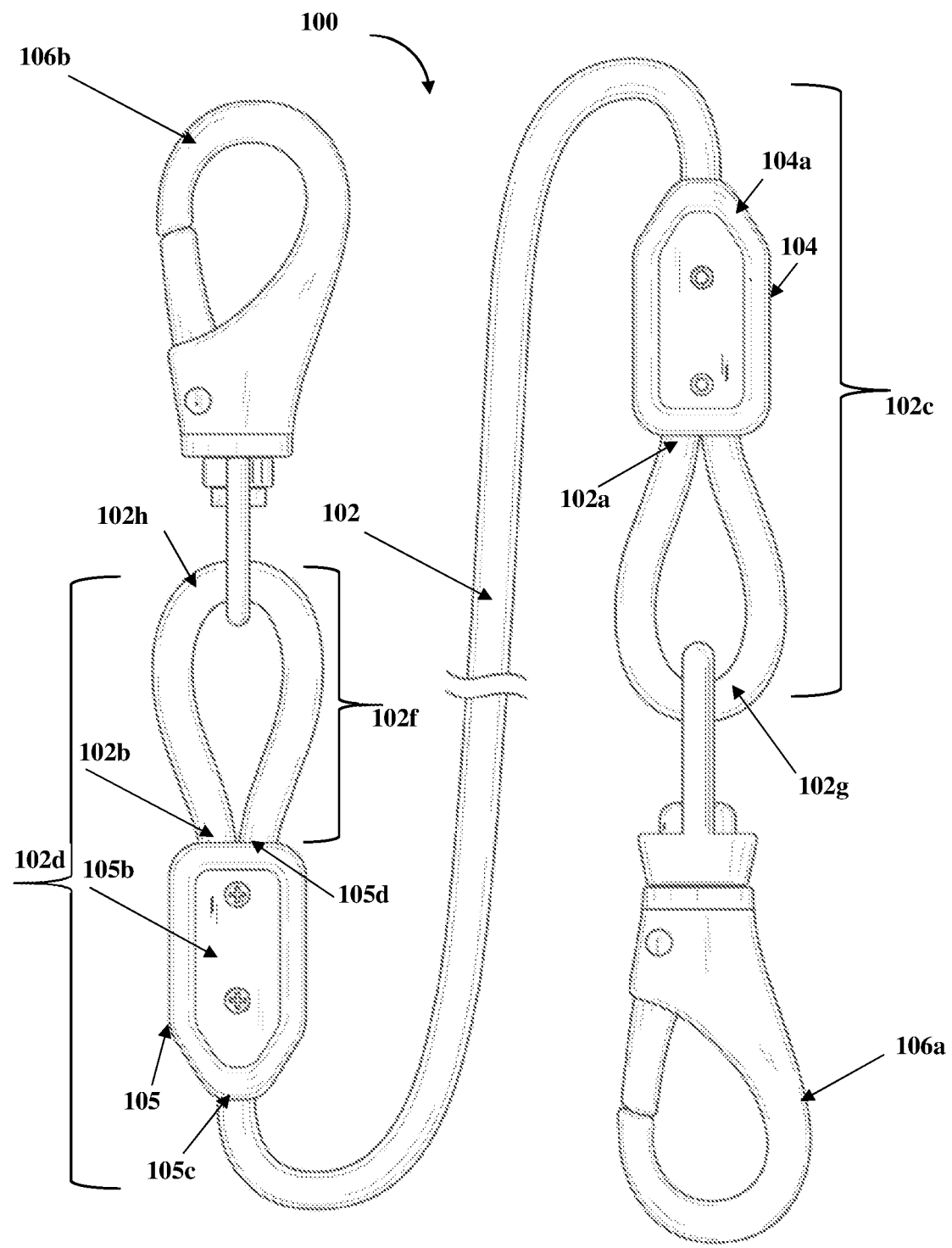
FIG. 2 illustrates a rear view of the pet tether.

FIG. 2 illustrates a rear view of the pet tether 100. As illustrated in FIGS. 1-4, the structure of the second cord clamp 105 is similar to the structure of the first cord clamp 104. The second cord clamp 105 comprises a base 105a and cap 105b, as shown in FIGS. 1 and 2. The second cord clamp 105 is configured to clamp the second end 102b of the cord 102 when the second end 102b of the cord 102 passes through the second cord clamp 105 and loops 102h back into the second cord clamp 105, as shown in FIGS. 1 and 2. As illustrated in FIG. 2, a second portion 102d of the flexible and stretchable cord 102 that is proximal to the second end 102b of the flexible and stretchable cord 102 engages with the second cord clamp 105 with only a mid-section 102f of the second portion 102d of the flexible and stretchable cord 102 projecting outside a first end 105c of the second cord clamp 105. The second end 102b of the flexible and stretchable cord 102 enters the second cord clamp 105 through a first opening (not shown) on the first end 105c, exits the second cord clamp 105 through a second opening (not shown), forms a loop 102h with the mid-section 102f of the second portion 102d of the flexible and stretchable cord 102, reenters the second cord clamp 105 through the second opening (not shown) on the second end 105d. The second cord clamp 105 further comprises a base 105a and a cap 105b, as illustrated in FIGS. 1 and 2. The base 105a comprises spikes (not shown), similar to spikes on the base 104a of the first cord clamp 104 that pierce the flexible and stretchable cord 102. The cap 105b of the second cord clamp 105 is then fastened to the base 105a of the second cord clamp 105 using fastening members 114 to secure the second end 102b of the flexible and stretchable cord 102 with the second cord clamp 105.

Figure 3:
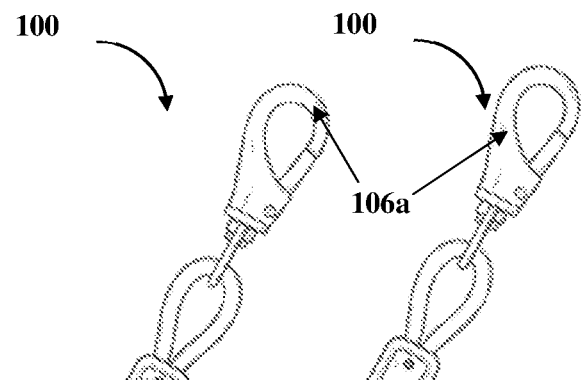
FIG. 3 illustrates a rear view of the pet tether, shown in a non-stretched state.
Figure 4:
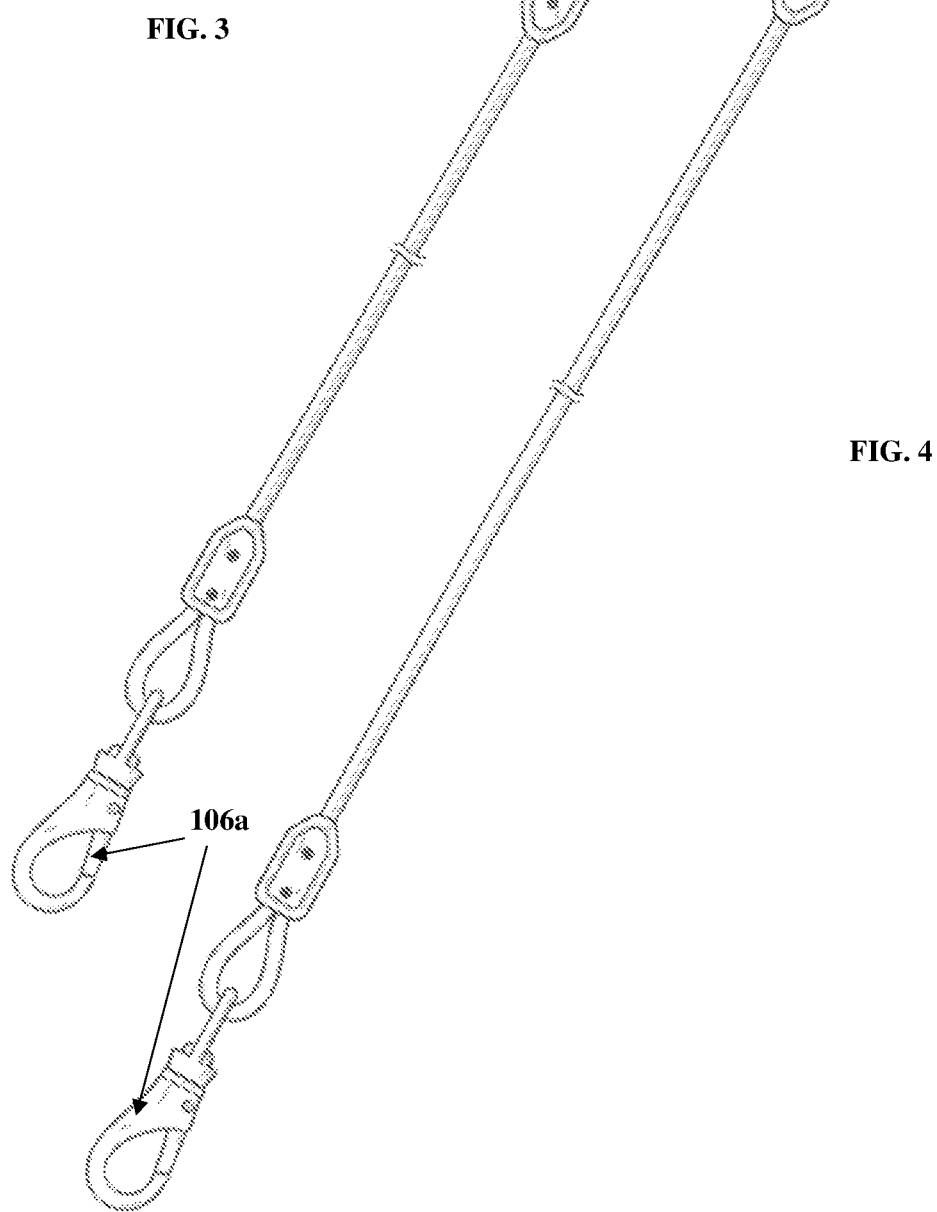
FIG. 4 illustrates a rear view of the pet tether, shown in a stretched state.

FIG. 3 illustrates a rear view of the pet tether 100, shown in a non-stretched state. FIG. 4 illustrates a rear view of the pet tether 100, shown in a stretched state. The flexible and stretchable cord 102 of the pet tether 100 is for example, a stretch cord, a bungee cord, a shock cord, an elastic rope, etc. The flexible and stretchable cord 102 of the pet tether 100 is made of a pliable material that is weather-resistant and easy to untangle to reduce frustration for pet owners 1300 and increase confidence that the first and second ends 102a and 102b, and the first and second engagement elements 106a and 106b of the pet tether 100 remain uncompromised. In an embodiment, the flexible and stretchable cord 102 of the pet tether 100 comprises an expandable braided sleeve over the flexible and elastic material of the flexible and stretchable cord 102. The expandable braided sleeve stretches lengthwise along the length of the flexible and stretchable cord 102.

The flexible and stretchable cord 102 has an extensibility greater than a relaxed, unstretched state of the flexible and stretchable cord 102. In an embodiment, the extensibility of the flexible and stretchable cord is greater than about 60% more than the relaxed, unstressed state of the flexible and stretchable cord 102. In another embodiment, the extensibility of the flexible and stretchable cord 102 is greater than about 80% more than the relaxed, unstressed state of the flexible and stretchable cord 102. In another embodiment, the extensibility of the flexible and stretchable cord 102 is greater than about 100% more than the relaxed, unstressed state of the flexible and stretchable cord 102. In another embodiment, the extensibility of the flexible and stretchable cord 102 is greater than about 150% more than the relaxed, unstressed state of the flexible and stretchable cord 102. The pet tether 100 which is flexible and stretchable, precludes the sudden and abrupt, wrenching of the pet's 500 neck 504. In an event the pet 500 pulls away from the first end 102a, at a speed, the flexible and stretchable cord 102 stretches and extends along its length. After stretching to a certain length, the rate of stretching of the flexible and stretchable cord 102 gradually decreases, thereby gradually reducing the speed of the pet. Thereafter, the flexible and stretchable cord 102 stops stretching to gently bring the pet 500 to a halt.

In an embodiment, the flexible and stretchable cord 102 is an elastic tubular body extending along a length thereof. In an embodiment, the flexible and stretchable cord 102 is configured to sustain tensile forces. In an embodiment, the flexible and stretchable cord 102 is made of a natural elastic material, synthetic elastic material, and a combination of natural and synthetic elastic materials. In an embodiment, the flexible and stretchable cord 102 has an elastic tubular body that facilitates the flexible and stretchable cord 102 to stretch and retract along the length of the flexible and stretchable cord 102.

Figure 5:
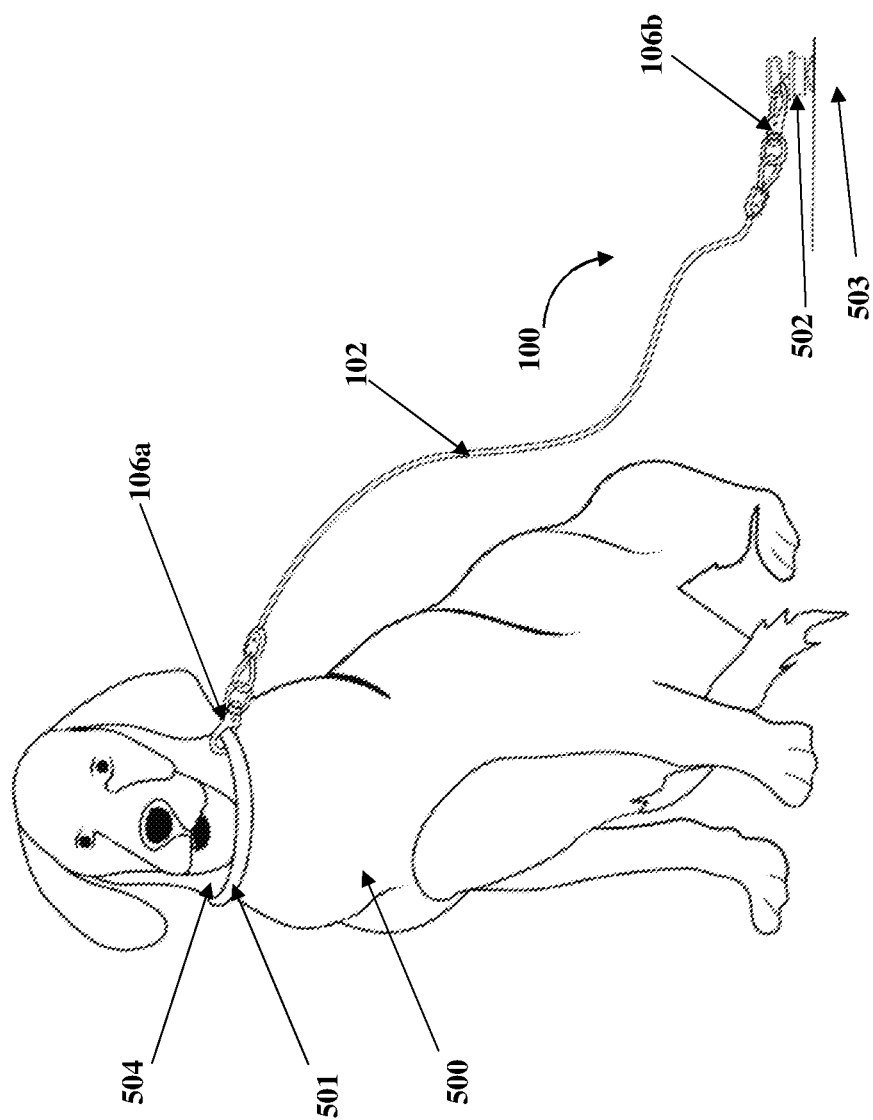
FIG. 5 illustrates a first end of the pet tether attached to a collar on a pet, through a first engagement element, and a second end of the cord of the pet tether secured to a ground stake through a second engagement element.

The pet tether 100 further comprises a first engagement element 106a connected to the loop 102g in the first end 102a of the flexible and stretchable cord 102, as shown in FIGS. 1-2. The pet tether 100 further comprises a second engagement element 106b connected to the loop 102h in the second end 102b of the flexible and stretchable cord 102. Examples of first and second engagement elements 106a and 106b comprise a spring-loaded pull-type belt clip, as illustrated in FIGS. 1-5, 13 and 14, a Carabiner with a spring-loaded gate, a claw clasp, etc. The spring-loaded pull-type belt clip illustrated in FIGS. 1-5, 13 and 14 360-degree, rust-free swivel clip FIG. 5 illustrates the first end 102a of the cord 102 of the pet tether 100 attached to a collar 501 on a pet 500, through the first engagement element 106a, and the second end 102b of the flexible and stretchable cord 102 of the pet tether 100 secured to a ground stake 502 through the second engagement element 106b.

Figure 6:
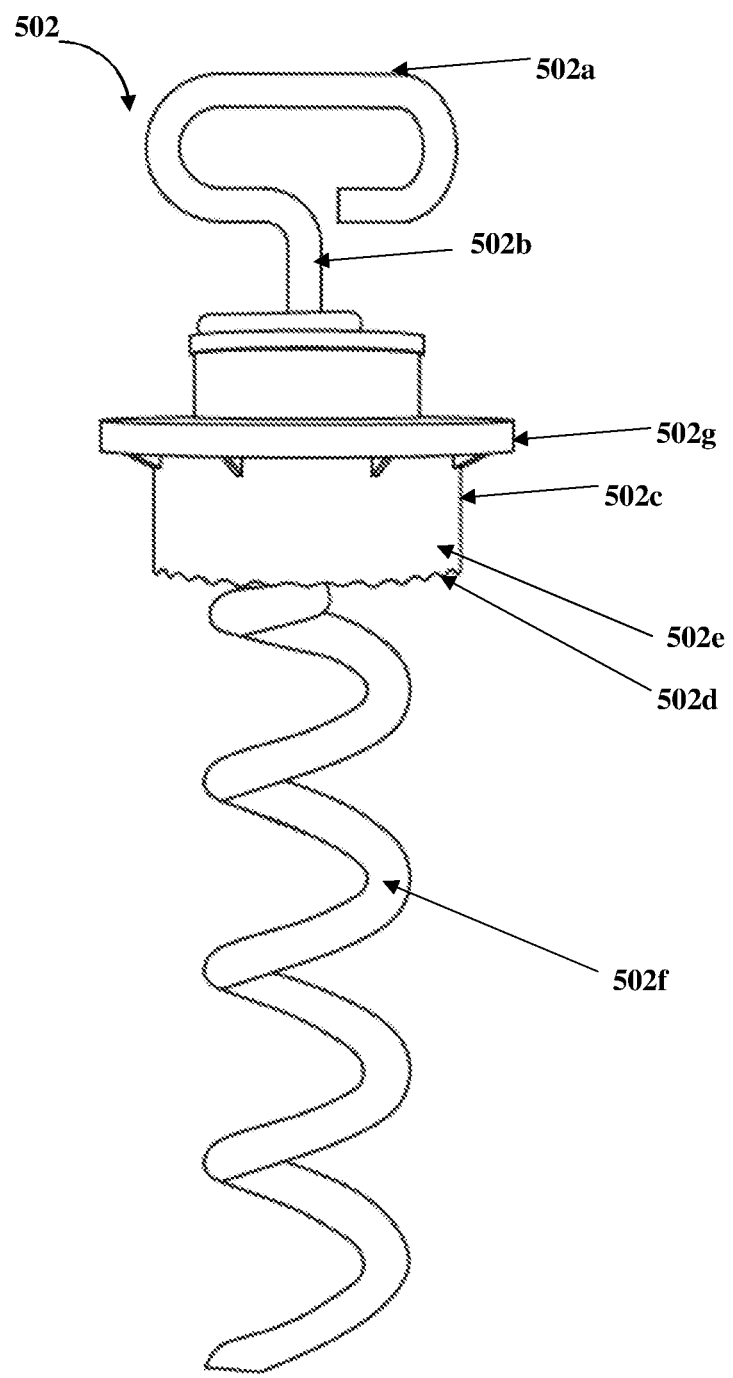
FIG. 6 illustrates a ground stake used to securely attach the pet tether to a ground surface.

FIG. 6 illustrates the ground stake 502 used to securely attach the pet tether 101 to a ground surface 503. The ground stake 502 is, for example, an Intelli-Stayk Surface-Lock Dog Tie-Out Stake, illustrated in FIG. 6. The Intelli-Stayk Surface-Lock Dog Tie-Out Stake is manufactured by IntelliLeash® Products of Plainfield, Ill., U.S.A. The ground stake 502 illustrated in FIG. 6 comprises a twistable handle 502a, a surface lock cup 502c having a sawtooth pattern 502d at the bottom 502e of the surface lock cup 502c, a spring shaped stake 502f located below the surface lock cup 502c, and a shaft 502b passing through the center of the surface lock cup 502c and attaching the twistable handle 502a with the spring shaped stake 502f. The twistable handle 502a is twisted to drive the spring shaped stake 502f into the ground surface 503. When the surface lock cup 502c touches the ground surface 503, twisting the twistable handle 502a causes the sawtooth pattern 502d at the bottom 502e of the surface lock cup 502c to clear the earth and drive the surface lock cup 502c and the spring shaped stake 502f further into the ground surface 503. A raised platform 502g projecting laterally from the top of the surface lock cup 502c prevents the surface lock cup 502c and the spring shaped stake 502f from further being driven into the ground surface 503 when the ground surface 503 contacts the raised platform 502g. In another embodiment, the second engagement element 106b is attached to a swivel tie-out, overhead pully run line, or another secure apparatus.

FIG. 7 illustrates a front right-side perspective view of an embodiment of the first cord clamp 704 comprising light sources 705a-705e shown in FIG. 9. FIG. 8 illustrates a rear left-side perspective view of the embodiment of the first cord clamp 704 comprising the light sources 705a-705e.

FIG. 9 illustrates a front view of the embodiment of the first cord clamp 704 with the cap 104b of the first cord clamp 704 removed to illustrate the base 104a of the first cord clamp 704 comprising the light sources 705a-705e, a pull type switch 701, a slide switch 702, batteries 703 and the flexible and stretchable cord 102. The slide switch 702 comprises a slider 702b configured to be slid, by application of force by the pet's owner 1300 along a track 702a to various positions on the track 702a when the pet's owner 1300 wishes to select the one or more light sources 705a-705e. The pull type switch 701 is configured to switch on one or more of the light sources 705a-705e, when the flexible and stretchable cord 102 experiences a pulling force and is placed under tension by the pull exerted by the movement of the pet 500 in the general direction of movement of the pet, between the first end 102a and the second end 102b, and based on the position of the slide switch 702. As illustrated in FIG. 9, the light sources 705a-705e comprise a first light source comprising a first horizontally aligned light source 705a and a first vertically aligned light source 705b. The light sources 705a-705e further comprise a second light source comprising a second horizontally aligned light source 705c. The light sources 705a-705e further comprise a third light source comprising a third horizontally aligned light source 705d and a third vertically aligned light source 705e. The batteries 703 are in electrical communication the light sources 705a-705e, the pull type switch 701, and the slide switch 702 to power the light sources 705a-705e. In an embodiment, the first light source comprising the first horizontally aligned light source 705a and the first vertically aligned light source 705b comprise a first transparent shroud 705f, as shown in FIG. 7, to protect the first horizontally aligned light source 705a and the first vertically aligned light source 705b from dirt and moisture. Similarly, the second light source comprising the second horizontally aligned light source 705c comprise a second transparent shroud 705g, and the third light source comprising the third horizontally aligned light source 705d and the third vertically aligned light source 705e comprise a third transparent shroud 705h. In an embodiment, the light sources 705a-705e comprise light emitting diodes (LEDs), electric bulbs, etc.

As shown in FIGS. 9 and 10, the slide switch 702 comprises a slider 702b. The slider 702b is configured to be slid, along a track 702a to various positions on the track 702a, by application of force by the pet's owner 1300. FIGS.

9 and 10 exemplarily illustrate numerals 0 through 4 marked along the track 702a. Sliding the slider 702b, for example, by the pet's owner 1330, to one of the positions corresponding to the numerals 0 through 4 selects the one or more light sources 705a-705e that are switched on when the pull type switch 701 is activated by the pull of the first end 102a of the cord 102 away from the first end 102b by the pet 501. In an embodiment, positioning the slider 702b by a pet owner corresponding to the numeral 0, 1, 2, 3, or 4 switches on either the first horizontally aligned light source 705a, the first vertically aligned light source 705b, the second horizontally aligned light source 705c, the third horizontally aligned light source 705d, or the third vertically aligned light source 705e, respectively.

Figure 13:
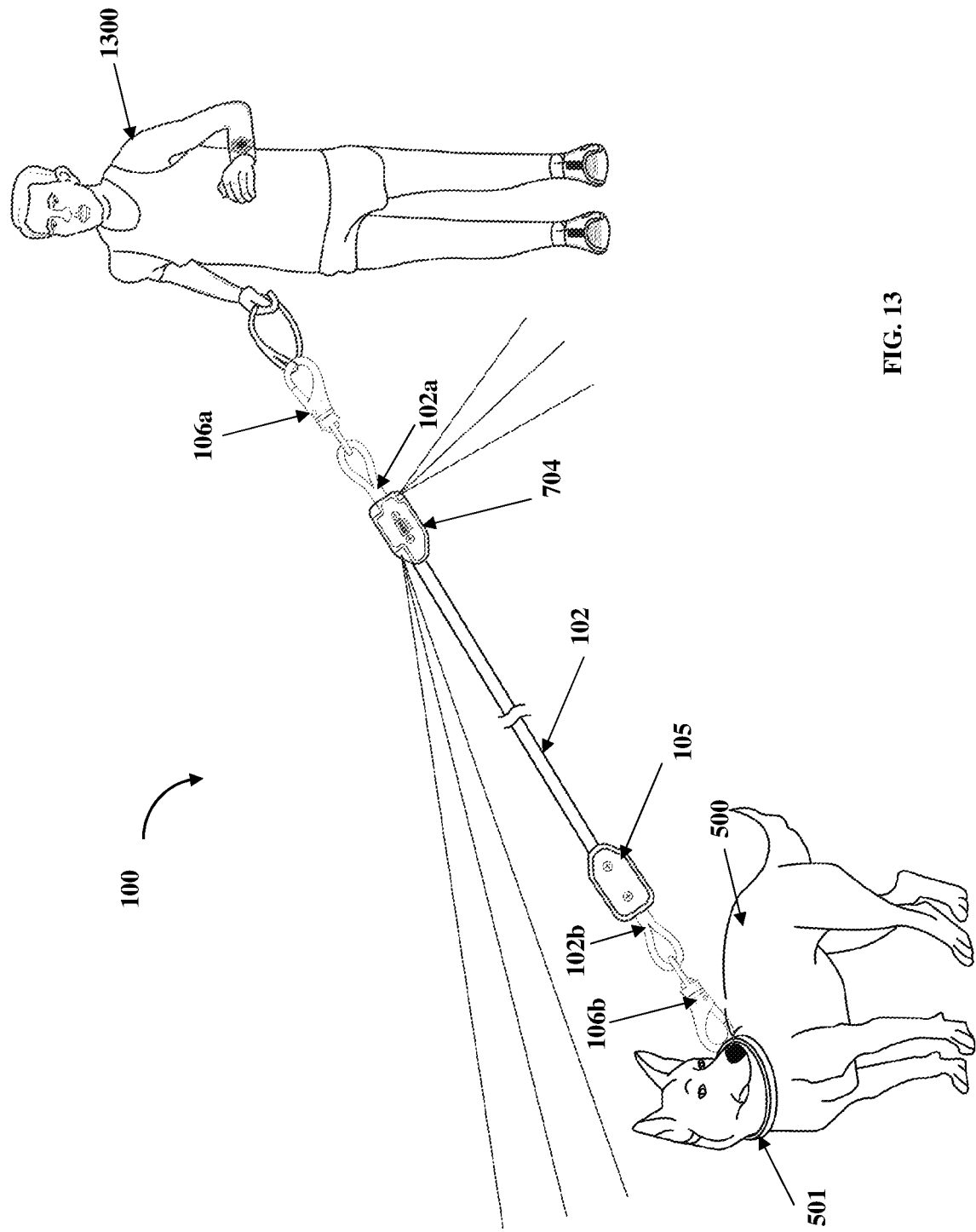
FIG. 13 illustrates a first horizontally aligned light source and a third vertically aligned light source of the one or more light sources in the embodiment of the first cord clamp, illuminating a ground surface in front of a pet and a ground surface in front of the pet's owner, when the pet tether is placed under tension by the movement of the pet attached to the pet tether.

In an embodiment, the slide switch 702 comprises additional positions 5,6,7, etc. marked on the track 702a that correspond to a selection of two of the light sources 705a-705e. Sliding the slider 702b into one of these positions, for example, numeral 5 on the track 702a switches on the first horizontally aligned light source 705a and the third vertically aligned light source 705e, as shown in FIG. 13. Sliding the slider 702b into a position that corresponds to numeral 6 on the track 702a switches on the first horizontally aligned light source 705a and the first vertically aligned light source 705b.

In an embodiment, the slide switch 702 comprises additional positions on the track 702a marked by numerals that correspond to a selection of three of the light sources 705a-705e. In another embodiment, the slide switch 702 comprises additional positions on the track 702a marked by numerals that correspond to a selection of four of the light sources 705a-705e. In another embodiment, the slide switch 702 comprises another position on the track 702a marked by a numeral that correspond to a selection of all the five light sources 705a-705e. The position of the slide switch 702 on the track 702a determines the selection of one or more light sources 705a-705e that are switched on by pulling the pull type switch 701 by the pet owner.

FIG. 10 illustrates the batteries 703 in electrical communication with the pull type switch 701 through electrical supply line 704i, shown in dash-double dot-dash lines, pull type switch 701 in electrical communication with the slide switch 702 through electrical supply line 705h, shown in dash-dot-dash lines, and the light sources 705a-705e in electrical communication with the slide switch 702 through electrical supply lines 705g, shown in dotted lines. When the pull type switch 701 is activated by the pull of the first end 102a of the cord 102 away from the first end 102b, electricity flows from the batteries 703 to the slide switch 702 through the electrical supply lines 704i, the pull type switch 701, and the electrical supply line 704h. The position of the slider 702b on the track 702a of the slide switch 702 determines the selection of the one or more light sources 705a-705e to be switched on. Although FIG. 10 illustrates a single electrical supply lines 705g connecting the light sources 705a-705e to the slide switch 702, in an embodiment each light source 705a, 705b, 705c, 705d, and 705e is in electrical communication with the slide switch 702 through a separate electrical supply line 705g to enable the pet's owner 1300 to select either one, two, three, four or all of the light sources 705a-705e through the slide switch 702.

In an embodiment, as illustrated in FIG. 10, the first cord clamp 705 comprises a photovoltaic sensor 706a in electrical communication with the electrical supply line 704i that electrically connects the batteries 703 to the pull type switch 701. The photovoltaic sensor 706a is configured to establish an electrical connection between the batteries 703 and the pull type switch 701 through the electrical supply line 704i if the photovoltaic sensor 706a fails to detect a predetermined amount of light. As illustrated in FIG. 10, the first cord clamp 705 further comprises a disable switch 706b to disable the photovoltaic sensor 706a. The pet owner 1300 disables the photovoltaic sensor 706a using the disable switch 706b when the pet owner desires to switch on the light sources 705a-705e irrespective of environmental lighting conditions.

In an embodiment, as illustrated in FIG. 10, the first cord clamp 705 comprises a controller 707 connected to the photovoltaic sensor 706a. The controller 707 is also in direct electrical communication with the light sources 705a-705e through electrical supply line 704k, bypassing the slide switch 702. The controller 707 obtains a voltage from the photovoltaic sensor 706a and switches on one or more of the one or more light sources 705a-705e. If the voltage from the photovoltaic sensor 706a is below a first threshold, the controller 707 switches on one of the one or more light sources 705a-705e. If the voltage from the photovoltaic sensor 706a is below a first threshold but above a second threshold, the controller 707 switches on two of the one or more light sources 705a-705e, etc. The first cord clamp 705 further comprises a disable switch 707a to disable the controller 707 and instead relies on the position of the slider 702b of the slide switch 702 to select the one or more light sources 705a-705e.

The embodiment of the first cord clamp 704 also comprises spikes 104g similar to the first cord clamp 104. FIG. 10 illustrates a front view of the second embodiment of the first cord clamp 704 showing the spikes 104g in the base 104h of the first cord clamp 704. FIG. 11 illustrates a left-side view of one of the spikes 104g in the base 104h of the first cord clamp 704. The right-side, front and rear views of the spike 104g are mirror images of the left-side view of the spike 104g.

FIG. 12 illustrates a front view of the second embodiment of the first cord clamp 704 with the cap 704b of the first cord clamp 704 fastened to the base 704a of the second embodiment of the first cord clamp 704 using fasteners 114.

FIG. 13 illustrates a first horizontally aligned light source 705a and a third vertically aligned light source 705e of the one or more light sources 705a-705e in the embodiment of the first cord clamp 705, illuminating a ground surface in front of a pet 500 and a ground surface in front of the pet's owner 1300, in the direction the pet is moving with the pet tether 100 in use.

Figure 14:
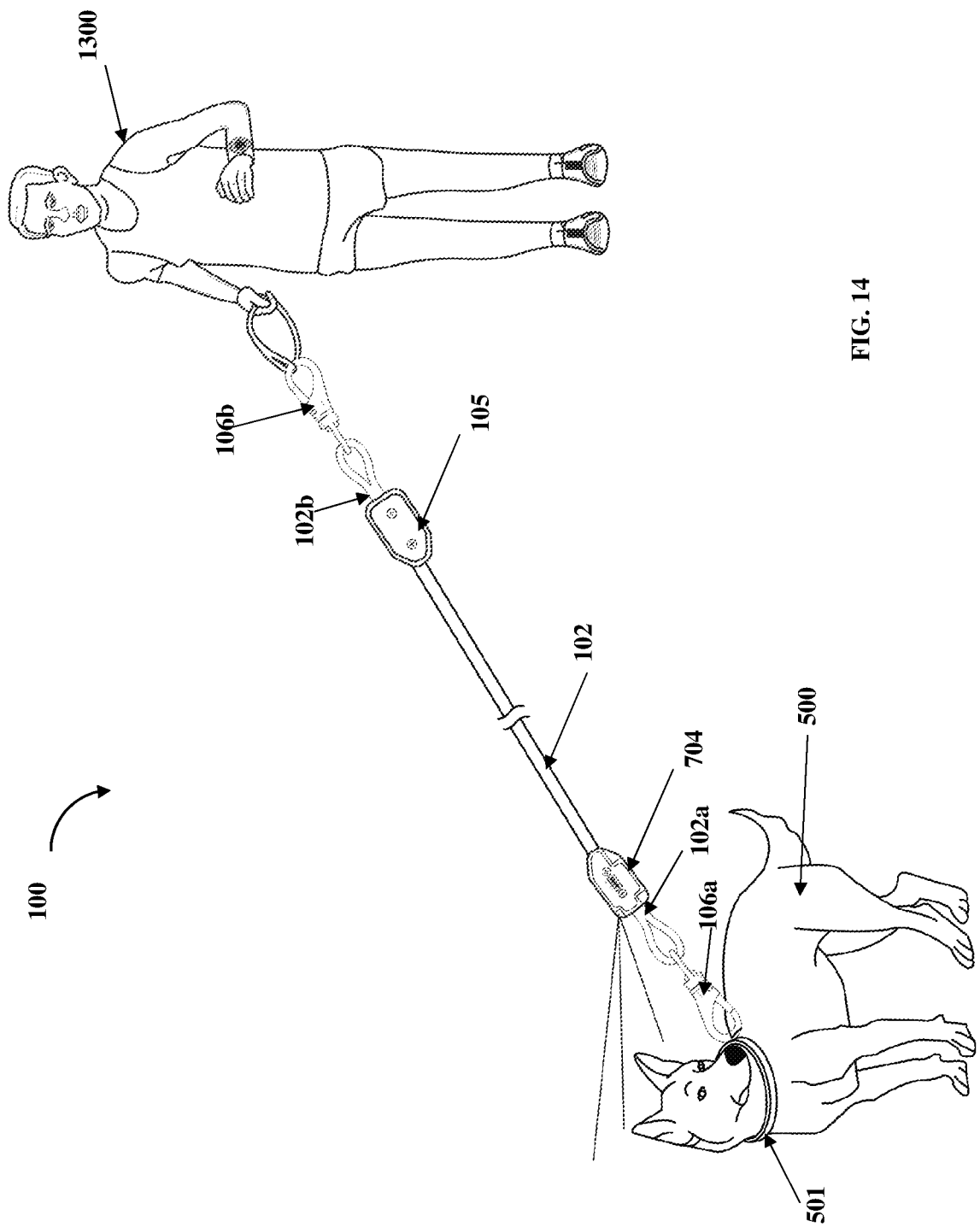
FIG. 14 illustrates a third horizontally aligned light source in the embodiment of the first cord clamp, illuminating a ground surface in front of the pet, when the pet tether is placed under tension.

FIG. 14 illustrates a third horizontally aligned light source 705d in the second embodiment of the first cord clamp 705, illuminating a ground surface in front of the pet 500, when the pet tether 100 is in use. In an embodiment, the pet tether 100 is configured to provide illumination to the surface of the ground near the pet 500 even when the pet tether 100 is flipped end-over-end, as shown in FIG. 14. FIG. 14 illustrates the first cord clamp 705 attached to the collar 501 of the dog 500 through the second engagement element 106b. The pet's owner 1300 switches on the third horizontally aligned light source 705d to illuminate the ground surface in the direction the pet is moving in front of the pet 500. In an embodiment, the pet's owner 1300 additionally switches on the second horizontally aligned light source 705c. In another embodiment, the pet's owner 1300 switches on the second horizontally aligned light source 705c instead of the third horizontally aligned light source 705d.

The foregoing examples have been provided merely for explanation and are in no way to be construed as limiting of the pet tether 100 disclosed herein. While the pet tether 100 has been described with reference to various embodiments, it is understood that the words, which have been used herein, are words of description and illustration, rather than words of limitation. Furthermore, although the pet tether 100 has been described herein with reference to particular means, materials, and embodiments, the pet tether 100 is not intended to be limited to the particulars disclosed herein; rather, the pet tether 100 extends to all functionally equivalent structures and uses, such as are within the scope of the appended claims. While multiple embodiments are disclosed, it will be understood by those skilled in the art, having the benefit of the teachings of this specification, that pet tether 100 disclosed herein is capable of modifications, and other embodiments may be effected and changes may be made thereto, without departing from the scope and spirit of the pet tether 100 disclosed herein.

We claim:

1. A flexible, non-metal pet tether, the tether comprising:
   a flexible bungee cord comprising a first end and a second end;
   a first cord clamp configured to clamp the first end of the cord when the first end of the cord passes through the first cord clamp and loops back into the first cord clamp; and
   a second cord clamp configured to clamp the second end of the cord when the second end of the cord passes through the second cord clamp and loops back into the second cord clamp;
   wherein the first cord clamp comprises a motion activated light and a battery source, the motion activated light having an on/off switch.

2. The pet tether of claim 1 further comprising:
   a first engagement element connected to the loop in the first end of the cord; and
   a second engagement element connected to the loop in the second end of the cord.

3. The pet tether of claim 1, wherein the first cord clamp comprises one or more light sources.

4. The pet tether of claim 3, wherein the first cord clamp further comprises a pull type switch to switch on the one or more light sources.

5. The pet tether of claim 3, wherein the one or more light sources comprise a first light source, a second light source and a third light source, wherein the first light source comprises a first horizontally aligned light source and a first vertically aligned light source, wherein the second light source comprises a second horizontally aligned light source, and wherein the third light source comprises a third horizontally aligned light source and a third vertically aligned light source.

6. The pet tether of claim 5, wherein said first cord clamp further comprises a slide switch to select the first horizontally aligned light source, the first vertically aligned light source, the second horizontally aligned light source, the third horizontally aligned light source, and the third vertically aligned light source.

7. The pet tether of claim 3, wherein the first cord clamp further comprises a battery.

8. The pet tether of claim 1, wherein the flexible and stretchable cord is one of a stretch cord, a bungee cord, a shock cord, and an elastic rope.

9. The flexible pet tether of claim 8, wherein the flexible cord has an extensibility greater than a relaxed, unstressed state of the flexible cord, wherein the extensibility of the flexible cord is greater than 130% more than the relaxed, unstressed state of the flexible cord.

* * * * *